(12) United States Patent
Wu et al.

(10) Patent No.: US 7,697,436 B2
(45) Date of Patent: Apr. 13, 2010

(54) BANDWIDTH ALLOCATION

(75) Inventors: Guoliang Wu, Plano, TX (US); Zhao Yang, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 493 days.

(21) Appl. No.: 11/675,508

(22) Filed: Feb. 15, 2007

(65) Prior Publication Data

US 2007/0189169 A1   Aug. 16, 2007

Related U.S. Application Data (60) Provisional application No. 60/774,100, filed on Feb. 15, 2006.

(51) Int. Cl.
*H04L 12/26* (2006.01)
(52) U.S. Cl. .................. 370/235; 370/412
(58) Field of Classification Search ...... 370/229–235.1, 370/412, 418
See application file for complete search history.

(56) References Cited

U.S. PATENT DOCUMENTS

| | | | | |
|---|---|---|---|---|
| 5,535,201 | A * | 7/1996 | Zheng .................. | 370/230.1 |
| 6,067,301 | A * | 5/2000 | Aatresh ................. | 370/418 |
| 6,185,189 | B1 | 2/2001 | Brassier et al. ........... | 370/236 |
| 6,442,164 | B1 | 8/2002 | Wu ......................... | 370/395 |
| 6,477,167 | B1 | 11/2002 | Wu ......................... | 370/395 |
| 6,504,819 | B2 | 1/2003 | Fowler et al. ............ | 370/230 |
| 6,591,299 | B2 | 7/2003 | Riddle et al. ............. | 709/224 |
| 6,647,008 | B1 | 11/2003 | Galand et al. ............ | 370/389 |
| 6,650,655 | B2 | 11/2003 | Alvesalo et al. .......... | 370/468 |
| 6,661,802 | B1 | 12/2003 | Homberg et al. ......... | 370/412 |
| 6,665,301 | B1 | 12/2003 | Wu ......................... | 370/395 |
| 6,879,560 | B1 | 4/2005 | Cahn ...................... | 370/230 |
| 6,980,513 | B2 | 12/2005 | Novick .................... | 370/230 |
| 6,987,741 | B2 | 1/2006 | Kelly et al. .............. | 370/321 |
| 7,027,414 | B2 | 4/2006 | Walsh et al. ............. | 370/316 |
| 7,042,848 | B2 | 5/2006 | Santiago et al. .......... | 370/253 |
| 2002/0075803 | A1 * | 6/2002 | Zaharychuk et al. ..... | 370/231 |
| 2005/0015494 | A1 | 1/2005 | Adamczyk et al. ....... | 709/226 |
| 2005/0120102 | A1 | 6/2005 | Gandhi et al. ........... | 709/223 |
| 2005/0157735 | A1 * | 7/2005 | Kan et al. ................ | 370/412 |
| 2005/0271084 | A1 | 12/2005 | Bruckman et al. ....... | 370/468 |

\* cited by examiner

*Primary Examiner*—Kwang B Yao
*Assistant Examiner*—Andrew Lai
(74) *Attorney, Agent, or Firm*—Baker Botts, L.L.P.

(57) ABSTRACT

In certain embodiments, a method for bandwidth allocation includes receiving at least a first traffic flow and a second traffic flow, each traffic flow including at least committed information rate (CIR) and excess information rate (EIR) parameters. The CIR parameter in each traffic flow is associated with a corresponding guaranteed pass-through rate. The first traffic flow and the second traffic flow are stored in first and second queues, respectively. The first queue is associated with a first provisioned weight, and the second queue is associated with a second provisioned weight. The method further includes scheduling downstream transmission of the first traffic flow and second traffic flow stored in the first and second queues according to at least first and second implementation weights that are determined based on a bandwidth of a downstream communication link, a CIR parameter of the first queue, a CIR parameter of the second queue, and each of the first and second provisioned weights.

30 Claims, 2 Drawing Sheets

BANDWIDTH ALLOCATION

RELATED APPLICATION

This application claims the benefit under 35 U.S.C. § 119 (e) of U.S. Provisional Application No. 60/774,100, entitled, "System and Method for Bandwidth Allocation," filed on Feb. 15, 2006.

TECHNICAL FIELD

The present invention relates generally to communication systems and more particularly to bandwidth allocation.

BACKGROUND

Communication networks may bottleneck at a point in the network that receives more traffic than it can pass. In other words, at that point in the network, there is not sufficient downstream bandwidth to pass all of the traffic at once. In such cases, a decision must be made as to the manner in which bandwidth will be allocated among various incoming traffic flows. Typical systems do not provide a robust bandwidth allocation solution for allocating bandwidth among the various incoming traffic flows.

SUMMARY

According to the present invention, disadvantages and problems associated with previous techniques for bandwidth allocation may be reduced or eliminated.

In certain embodiments, a method for bandwidth allocation includes receiving at least a first traffic flow and a second traffic flow, each traffic flow including at least committed information rate (CIR) and excess information rate (EIR) parameters. The CIR parameter in each traffic flow is associated with a corresponding guaranteed pass-through rate. The first traffic flow and the second traffic flow are stored in first and second queues, respectively. The first queue is associated with a first provisioned weight, and the second queue is associated with a second provisioned weight. The method further includes scheduling downstream transmission of the first traffic flow and second traffic flow stored in the first and second queues according to at least first and second implementation weights that are determined based on a bandwidth of a downstream communication link, a CIR parameter of the first queue, a CIR parameter of the second queue, and each of the first and second provisioned weights.

In certain embodiments, a method for allocating bandwidth includes accessing a corresponding CIR parameter for each of two or more weighted scheduling queues, the CIR parameter for a queue associated with a guaranteed pass-through rate. The method further includes accessing a corresponding EIR parameter for each of the two or more weighted scheduling queues, each weighted scheduling queue associated with a corresponding provisioned weight. The method further includes determining corresponding implementation weights for each of the two or more weighted scheduling queues. The implementation weights are for scheduling traffic stored in the two or more weighted scheduling queues for communication over a communication link and are determined according to a bandwidth of a communication link, each of the corresponding CIR parameters, and each of the corresponding provisioned weights.

Particular embodiments of the present invention may provide one or more technical advantages. Conventional techniques for scheduling traffic stored in weighted scheduling queues only address scheduling EIR traffic according to provisioned weights pre-assigned to the weighted scheduling queues. However, among other possible deficiencies, scheduling traffic stored in the weighted scheduling queues merely according to the provisioned weights may not allow CIRs to be guaranteed for the weighted scheduling queues. In certain embodiments, the present invention provides algorithms and mechanisms that can schedule multiple weighted scheduling queues with CIRs and EIRs, using determined implementation weights. In certain embodiments, scheduling traffic from queues according to the determined implementation weights may allow the CIRs of traffic flows to be satisfied, as well as the weighted throughput for the EIR traffic.

According to certain embodiments of the present invention, a network operator may be able to provide greater options for users communicating over its network. Typical systems do not offer users guaranteed throughput rates (i.e., CIRs). In certain embodiments, a network operator may offer users guaranteed throughput rates (CIRs), best effort traffic rates (EIRs), or a combination of both. In certain embodiments, guaranteed throughput rates (CIRs) provide minimum required throughputs while the excess rate (EIR) enhances performance. Subscribers may desire a certain amount of data throughput (guaranteed throughput, or CIR) and the ability to send additional traffic (excess rate, or EIR) when bandwidth is available. Service providers may be able to charge differently for the CIR and the EIR. In addition, particular embodiments offer improvements in how the provisioned weights associated with weighted scheduling queues translate into priorities for scheduling EIR traffic. Thus, operators may cater more closely to the bandwidth requirements of particular users. Particular embodiments may facilitate providing improved traffic management with differential Quality of Service (QoS).

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which.

DESCRIPTION OF EXAMPLE EMBODIMENTS

Figures 1, 2:
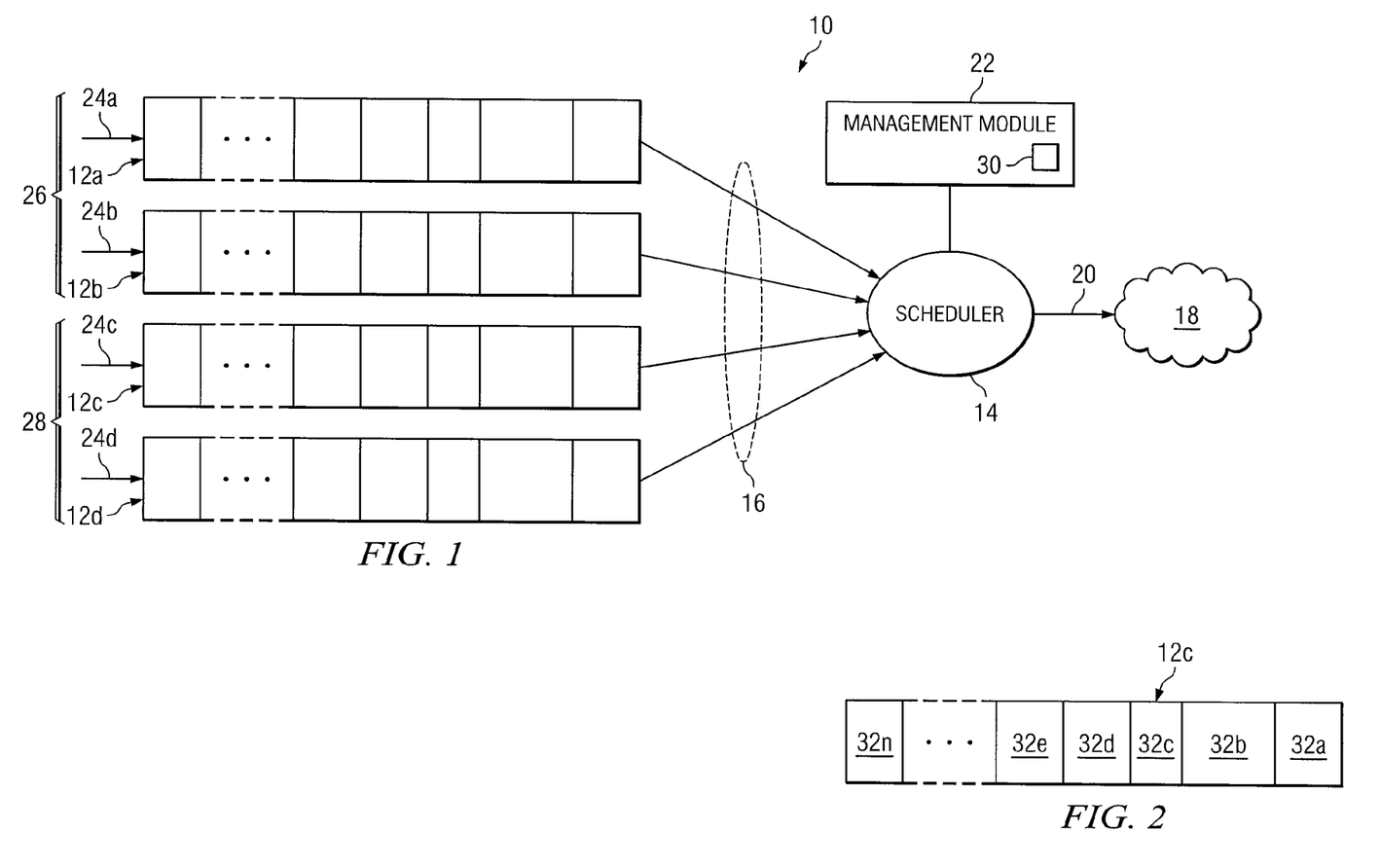
FIG. 1 illustrates an example system for allocating bandwidth.
FIG. 2 illustrates an example queue according to certain embodiments of the present invention.

FIG. 1 illustrates an example system 10 for allocating bandwidth. In the illustrated example, system 10 includes a number of queues 12 coupled to a scheduler 14 via one or more links 16, a network 18 coupled to scheduler 14 via a link 20, and a management module 22. Although this particular implementation of system 10 is illustrated and primarily described, the present invention contemplates any suitable implementation of system 10 according to particular needs.

In general, scheduler 14 schedules at least portions of traffic flows stored in queues 12 for transmission to network 18 via link 20, constrained by a limited bandwidth of link 20. For example, scheduler 14 may schedule packets of traffic stored in queues 12 for downstream transmission to network 18 via link 20, constrained by the limited bandwidth of link 20. Thus, portions of system 10, such as scheduler 14 and management module 22 may facilitate traffic management in a network or collection of networks. As examples only, traffic management may include one or more of network ingress traffic monitoring (e.g., local area network (LAN) ingress traffic policing), network-to-network queuing and scheduling (e.g., LAN-to-wireless area network (WAN) queuing and scheduling and/or WAN-to-LAN queuing and scheduling), congestion management, and admission control during flow provisioning.

Queues 12 may include any suitable type of storage medium and may be implemented in any suitable manner, according to particular needs. As just one example, queues 12 may be first-in, first-out queues. Although four queues 12 (i.e., queues 12a, 12b, 12c, and 12d) are illustrated and primarily described, the present invention contemplates system 10 including any suitable number of queues 12.

In general, queues 12 store information associated with one or more received traffic flows 24. Traffic flows 24 may originate from any suitable source. For example, traffic flows 24 may be received from one or more subscribers. A subscriber may include, for example purposes only, any suitable combination of communication devices, such as customer premises equipment, that use any appropriate communication techniques. Although particular types of subscribers are described, the present invention contemplates any suitable types of subscribers or other traffic flow sources at any suitable point in the network. Each traffic flow 24 may include any suitable type of information. For example, traffic flows 24 may include (in any suitable combination) one or more of voice traffic, data traffic, text traffic, multimedia traffic, or any other suitable type of information. Each traffic flow 24 may be associated with one or more subscribers or other clients.

Each traffic flow 24 may include one or more parameters. For example, traffic flows 24 may include one or more of a committed information rate (CIR) parameter, an excess information rate (EIR) parameter, and any other suitable parameters. In certain embodiments, certain of these parameters are negotiated by the subscribers associated with traffic flows 24; however, the present invention contemplates these parameters being determined or assigned in any suitable manner. For example, a particular subscriber may negotiate a particular CIR for transmission of its traffic flows 24, and traffic flows 24 for the particular subscriber may have a CIR parameter specifying the negotiated CIR. As another example, a particular subscriber may negotiate particular CIR and EIR for transmission of its traffic flows 24, and traffic flows 24 for the particular subscriber may have CIR and EIR parameters specifying the negotiated CIR and EIR, respectively.

The CIR parameter of a traffic flow 24 specifies a corresponding guaranteed pass-through rate (CIR) for the traffic flow 24. The CIR parameter may be bandwidth guarantee expressed in bits-per-second, for example. An EIR parameter of a traffic flow 24 refers to a transmission rate (EIR) that is in excess of the CIR to which transmission of traffic can burst when there is no congestion for transmission of traffic via link 20. The EIR parameter may be bandwidth expressed in bits-per-second, for example. These parameters may be used, in part, for policing, admission control, traffic scheduling, and any other suitable purposes. In certain embodiments, acceptable CIR and EIR parameters are defined by the Metro Ethernet Forum.

Traffic flows 24 may be divided into portions, such as packets. Each portion of a traffic flow 24 may have its own associated parameters, which may or may not be the same (or have the same values) as other portions of the traffic flow 24. For example, a traffic flow 24 may comprise a number of packets, some of which may include CIR traffic and some of which may include EIR traffic. These packets may be stored as packets in queues 12 and may vary in size.

Queues 12 may be coupled to scheduler 14 via one or more links 16. Generally, links 16 provide for communication between scheduler 14 and queues 12. Links 16 may be physical or logical links and may include memory access links or network communication links, according to particular needs.

Network 18 may include one or more local area networks (LANs), metropolitan area networks (MANs), wide area networks (WANs), radio access networks (RANs), a global computer network such as the Internet, or any other wireline, optical, wireless, or other links. Network 18 may communicate, for example, IP packets, Frame Relay frames, or Asynchronous Transfer Mode (ATM) cells to communicate voice, video, data, and other suitable information between network addresses.

Scheduler 14 may be coupled, either directly or indirectly, to network 18 via a link 20. Link 20 may include any suitable type of communication link, such as any suitable type of wireline, optical, wireless, or other links. The present invention contemplates any suitable intervening devices or other communication equipment (e.g., routers, switches, etc.) between scheduler 14 and network 18.

Link 20 may have a particular available bandwidth for communication of data. The bandwidth of link 20 may exceed the bandwidth that would be required to meet the CIRs and EIRs of each of traffic flows 24. Thus, scheduler 14 may use one or more scheduling algorithms or values determined from one or more scheduling algorithms to schedule traffic flows 24 in a manner that satisfies the CIRs and EIRs for traffic flows 24. Example scheduling algorithms are described in more detail below.

Queues 12 may be of various types. The type of a queue 12 may dictate the order in which scheduler 14 schedules traffic 24 stored in the queue 12 for transmission relative to traffic 24 in other queues 12. For example, queues 12 may be priority queues 26 or weighted scheduling queues 28. Priority queues 26 may store traffic 24 associated with CIR parameters only, and weighted scheduling queues 28 may store traffic 24 associated with one or more of CIR and EIR parameters. Thus, in certain embodiments, priority queues 26 store CIR traffic 24, whereas weighted scheduling queues 28 store both CIR and EIR traffic 24. Although particular numbers of priority queues 26 and weighted scheduling queues 28 are illustrated and primarily described, the present invention contemplates system 10 including any suitable numbers of priority queues 26 and weighted scheduling queues 28. Typically, however, system 10 includes at least one priority queue 26 and two or more weighted scheduling queues 28.

As described above, each traffic flow 24 may be assigned to one or more queues 12. The present invention contemplates any suitable types of intervening components receiving traffic flows 24 and determining, based on one or more of the parameters of the traffic flow 24 for example, in which queue 12 to store the received traffic flows 24. As just one example, one or more policers may receive traffic flows 24 and determine the appropriate queue 12 into which traffic flows 24 should be stored. The queue 12 in which to store a particular received traffic flow 24 may be determined in any suitable manner. For example, the policers may include one or more rules for determining that appropriate queue 12 in which to store portions (e.g., packets) of a traffic flow 24 according to one or more parameters (e.g., CIR parameter or EIR parameter) of the portions. The policer may determine on a packet-by-packet basis in which queue 12 a packet should be stored. Additionally or alternatively, the policer may determine that an entire traffic flow 24 (or a suitable sub-portion thereof) should be stored in a particular queue 12.

Scheduler 14 may schedule traffic flows 24 from queues 12 for transmission via limited-bandwidth link 20 to network 18. This scheduling may be determined, at least in part, according to the types of queues 12. In certain embodiments, scheduler 14 may schedule traffic 24 stored in priority queues 26 (which store CIR-only traffic 24) prior to scheduling traffic 24 stored in weighted scheduling queues 28 (which store both CIR and EIR traffic 24). In embodiments in which system 10 includes multiple priority queues 26, priority queues 26 may have a pre-assigned priority relative to one another, such that traffic 24 stored in a first priority queue 26 is scheduled prior to traffic 24 stored in a second priority queue 26 for example. Subsequent to scheduling traffic 24 stored in priority queues 26 (until priority queues 26 are empty, in certain embodiments), scheduler 14 may schedule traffic 24 stored in weighted scheduling queues 28. Scheduler 14 may schedule traffic 24 stored in weighted scheduling queues 28 according to one or more implementation weights, described in more detail below.

In the illustrated embodiment, system 10 includes four queues 12—queue 12a (which may be referred to as a Class A queue), queue 12b (which may be referred to as a Class B queue), queue 12c (which may be referred to as a Class C queue), and queue 12d (which may be referred to as a Class D queue). In this example, queues 12a and 12b are priority queues 26, queue 12a being of higher priority than queue 12b. Additionally, in this example, queues 12c and 12d are weighted scheduling queues 28. In certain embodiments, weighted round robin scheduling (augmented by the implementation weights described below) may be used to schedule traffic 24 stored in queues 12c and 12d, each of queues 12c and 12d being assigned a provisioned weight. The provisioned weights for weighted scheduling queues 28 may total one hundred percent (or the number one). The provisioned weights may be divided among weighted scheduling queues 28 in any suitable manner, according to particular needs. For example, queue 12c (which is a weighted scheduling queue 28 in the illustrated example) may be assigned a weight of 70%, while queue 12d (which is a weighted scheduling queue 28 in the illustrated example) may be assigned a weight of 30%. As another example, the provisioned weights may be divided between weighted scheduling queues 26 such that weighted scheduling queues 26 have equal provisioned weights (e.g., 50% for queue 12c and 50% for queue 12d).

It is generally desirable when scheduling traffic 24 that the CIRs of traffic flows 24 be guaranteed and that the EIRs of traffic flows 24 be transmitted proportionally to the provisioned weights (of the weighted scheduling queues 28 in which EIR traffic 24 is stored). Thus, in the illustrated example, it may be desirable to satisfy the CIRs of queues 12a, 12b, 12c, and 12d, while scheduling the EIR traffic 24 of queues 12c and 12d according to the provisioned weights assigned to queues 12c and 12d. Simply transmitting traffic 24 from queues 12c and 12d according to the provisioned weights of queues 12c and 12d typically will not meet these goals, as the CIR parameters of queues 12c and 12d will generally not be met by simply scheduling traffic 24 stored in queues 12c and 12d according to the provisioned weights of queues 12c and 12d.

In a particular example, suppose queues 12c and 12d have provisioned weights of 70% and 30%, respectively. Suppose further that traffic flows 24 to be stored in queue 12c (Class C traffic) has a CIR parameter of 18 megabits and an EIR parameter of 100 megabits. Suppose further that traffic flows 24 to be stored in queue 12d (Class D traffic) have a CIR parameter of 20 megabits and an EIR parameter of 120 megabits. The total amount of traffic transmitted over link 20 at any given time is limited by the capacity (e.g., bandwidth) of link 20. Thus, in the event that traffic 24 stored in data queues 12 exceeds the bandwidth of link 20, scheduler 14 must selectively schedule traffic 24 from queues 12.

In certain embodiments, scheduler 14 schedules traffic from weighted scheduling queues 28 (i.e., queues 12c and 12d) according to implementation weights determined from the weighted scheduling queues 28. The implementation weights may be determined based on at least the bandwidth of communication link 20, a CIR parameter of queue 12c, a CIR parameter of queue 12d, and each of the provisioned weights of queues 12c and 12d.

In certain embodiments, a queue 12 may store data associated with more than one traffic flow 24. Each of those traffic flows 24 may be associated with a CIR parameter and an EIR parameter. The CIR parameters of the various traffic flows 24 may be the same or different, and the EIR parameters of the various traffic flows 24 may be the same or different. In certain embodiments, to account for the various CIRs and EIRs of the traffic flows 24 of a queue 12, a total provisioned CIR parameter may be computed for each queue 12, and a total provisioned EIR parameter may be computed for each queue 12. The total provisioned CIR parameter for a particular queue 12 may be calculated by summing the values for the CIR parameters of each traffic flow 24 of the particular queue 12. The total provisioned EIR parameter for a particular queue 12 may be calculated by summing the values for the EIR parameters of each traffic flow 24 of the particular queue 12.

For example, each priority queue 26 (which stores CIR traffic 24) may be associated with a total provisioned CIR parameter that is equivalent to the sum of the CIR parameters of the one or more traffic flows 24 stored in the priority queue 26. As another example, each weighted scheduling queue 28 (which stores both CIR and EIR traffic 24) may be associated with a total provisioned CIR parameter (equivalent to the sum of the CIR parameters of the one or more traffic flows 24 stored in the weighted scheduling queue 28) and a total provisioned EIR parameter (equivalent to the sum of the EIR parameters of the one or more traffic flows 24 stored in the weighted scheduling queue 28). The total provisioned CIRs and EIRs may be recalculated if a new traffic flow 24 is directed to a particular queue 12 (and the implementation weights may be recalculated as well, if appropriate).

A particular example technique for calculating the implementation weights for weighted scheduling queues 28 is described below. In certain embodiments, the variables of the formulas may be defined as follows.

Bandwidth of link 20: X;
Total provisioned Class A CIRs (i.e., for queue 12a): $A_{CIR}$;
Total provisioned Class B CIRs (i.e., for queue 12b): $B_{CIR}$;
Total provisioned Class C CIRs (i.e., for queue 12c): $C_{CIR}$;
Total provisioned Class C EIRs (i.e., for queue 12c): $C_{EIR}$;
Total provisioned Class D CIRs (i.e., for queue 12d): $D_{CIR}$;
Total provisioned Class D EIRs (i.e., for queue 12d): $D_{EIR}$;

Assume that the sum of the CIRs of queues 12c and 12d is less than X and that the sum of all of the CIRs and EIRs of queues 12c and 12d is greater than X. The provisioned weight for queue 12c (the Class C queue) may be represented by the variable $W_C$, while the provisioned weight for queue 12d (the Class D queue) may be represented by the variable $W_D$. It may be assumed that $W_D=1-W_C$. The throughput for Class C EIR traffic 24 (EIR traffic 24 of queue 12c) may be represented by the variable $R_{EC}$, while the throughput for Class D EIR traffic 24 (EIR traffic 24 of queue 12d) may be represented by the variable $R_{ED}$. Certain embodiments of the present invention calculate actual scheduling weights for Class C and Class D traffic (the implementation weights), which may be represented by the variables $Q_C$ and $Q_D$, where $Q_D=1-Q_C$. In certain embodiments, use of the implementation weights by scheduler 14 to schedule traffic from the weighted scheduling queues 12 (queues 12c and 12d may ensure that one or more of the following is true:

$C_{CIR}$ and $D_{CIR}$ are substantially guaranteed; and $R_{EC}/R_{ED}=W_C/W_D$ when $C_{EIR}$ and $D_{EIR}$ compete for available X.

In certain embodiments, $Q_C$ and $Q_D$ may be obtained by solving the following two equations:

$$Q_C*(X-A_{CIR}-B_{CIR})=C_{CIR}+R_{EC}$$

$$Q_D*(X-A_{CIR}-B_{CIR})=D_{CIR}+R_{ED}$$

The solutions to these two equations may be the following two formulas, such that implementation weights $Q_C$ and $Q_D$ for queues 12c and 12d may be computed according to the following formulas:

$$Q_C=W_C+(W_D*C_{CIR}-W_C*D_{CIR})/(X-A_{CIR}-B_{CIR})$$

$$Q_D=W_D+(W_C*D_{CIR}-W_D*C_{CIR})/(X-A_{CIR}-B_{CIR})=1-Q_C$$

Thus, in this particular example in which queues 12c and 12d each include both CIR and EIR traffic 24, the $Q_C$ and $Q_D$ determined according to these formulas represent the implementation weights for each of queues 12c and 12d, respectively. In certain embodiments, the sum of the implementation weights may be the numeral 1.0 or one hundred percent, depending on the particular representation. In certain embodiments, the variable X, which represents the bandwidth of link 20, may be replaced by the expression X/beta, where beta represents a WAN encapsulation overhead factor.

System 10 may include a management module 22, which may be implemented in any suitable combination of hardware, firmware, and software. Management module 22 may include an application 30 that is operable to compute the implementation weights (e.g., $Q_C$ and $Q_D$) for scheduling transmission of traffic 24 stored in queues 12. Management module 22 may store values for the provisioned weights associated with weighted scheduling queues 28 (e.g., queues 12c and 12d). Management module 22 may include a suitable user interface with which a user may interact to specify one or more of the provisioned weights, bandwidth of link 20, CIR and/or EIR parameters of queues 12, or other suitable parameters. Additionally or alternatively, management module 22 may determine one or more of the provisioned weights, bandwidth of link 20, CIR and/or EIR parameters of queues 12, or other suitable parameters substantially without user interaction.

Management module 22 may provide the values for the implementation weights to scheduler 14 in any suitable manner. In certain embodiments, each time a traffic flow 24 is provisioned with a non-zero CIR parameter, each time the original CIR parameter for a traffic flow 24 is changed, or each time the provisioned weights of weighted scheduling queues 28 are changed, the implementation weights (e.g., Qc and Qd values) may change. This change may occur regardless of the scheduling class at issue. Application 30 may re-compute Qc and Qd according to the above-described equations and provide those implementation weights to scheduler 14.

Queues 12, scheduler 14, and management module 14 may be implemented in any suitable combination of hardware, firmware, and software. The components that compose queues 12, scheduler 14, and management module 14 may be local to one another (on a single or multiple devices) or remote from one another, according to particular needs. In certain embodiments, queues 12, scheduler 14, and management module 22 may be implemented as part of a multi-service provisioning platform (MSPP).

Queues 12, scheduler 14, and management module 14 may be implemented using one or more processing units and one or more memory units. The one or more processing units may each include one or more microprocessors, controllers, or any other suitable computing devices or resources. The one or more processing units may work either alone or in combination with other components of system 10 to provide the functionality of system 10. For example, operations performed by the one or more processing units may be performed collectively by the processing units and memory units. The one or more memory units may take the form of volatile or non-volatile memory including, without limitation, magnetic media, optical media, random access memory (RAM), read-only memory (ROM), removable media, or any other suitable memory component. The one or more memory units may be local to or remote from other components of system 10.

In a first non-limiting embodiment of system 10, scheduler 14 is operable to schedule traffic in an upstream direction, from a LAN to a WAN. In a second non-limiting embodiment of system 10, scheduler 14 is operable to schedule traffic in a downstream direction, from a WAN to a LAN.

Although the present description focuses on an embodiment that includes four queues 12 (two of which are priority queues 26 and two of which are weighted scheduling queues 28), those of ordinary skill in the art will understand that system 10 may include any suitable number of queues, any number of which may be priority queues 26 and weighted scheduling queues 28). Those of ordinary skill in the art will understand that the above-described formulas may be extended for calculation of implementation weights for additional weighted scheduling queues 12, if appropriate.

For example, the implementation weights for a generic number of weighted scheduling queues 28 may be determined based on at least the bandwidth of a communication link 20 (e.g., a downstream or upstream communication link), each of the CIR parameters of weighted scheduling queues 28, and each of the provisioned weights of weighted scheduling queues 28. A formula for determining such implementation weights for a generic number of weighted scheduling queues 28 may be expressed as follows:

$$Q_j = W_j + \left[(1-W_j)^*CIR_j - W_j^* \sum_{k=M+1, k \neq j}^{M+N} (CIR_k)\right] \Big/ \left(X/beta - \sum_{i=1}^{M} CIR_i\right)$$

(for $j = M+1 \ldots M+N$)

In this example, Q represents the implementation weight being determined for a given queue i. The variable M represents the number of priority queues 26, and the variable N represents the number of weighted scheduling queues 28. The variable W represents the provisioned weight of a weighted scheduling queue 28. Beta represents a WAN encapsulation overhead factor, although it should be noted that the present invention is not limited to scheduling transmission to a WAN.

Particular embodiments of the present invention may provide one or more technical advantages. Conventional techniques for scheduling traffic 24 stored in weighted scheduling queues 28 only address scheduling EIR traffic 24 according to provisioned weights pre-assigned to the weighted scheduling queues 28. However, among other possible deficiencies, scheduling traffic 24 stored in weighted scheduling queues 28 merely according to the provisioned weights may not allow CIRs to be guaranteed for weighted scheduling queues 28. In certain embodiments, the present invention provides algorithms and mechanisms that can schedule traffic 24 stored in multiple weighted scheduling queues 28 with CIRs and EIRs, using determined implementation weights. In certain embodiments, scheduling traffic 24 stored in weighted scheduling queues 28 according to the determined implementation weights may allow the CIRs of traffic flows 24 to be satisfied, as well as the weighted throughput for the EIR traffic 24.

According to certain embodiments of the present invention, a network operator may be able to provide greater options for users communicating over its network. Typical systems do not offer users guaranteed throughput rates (i.e., CIRs). In certain embodiments, a network operator may offer users guaranteed throughput rates (CIRs), best effort traffic rates (EIRs), or a combination of both. In certain embodiments, guaranteed throughput rates (CIRs) provide minimum required throughputs while the excess rate (EIR) enhances performance. Subscribers may desire a certain amount of data throughput (guaranteed throughput, or CIR) and the ability to send additional traffic (excess rate, or EIR) when bandwidth is available. Service providers may be able to charge differently for the CIR and the EIR. In addition, particular embodiments offer improvements in how the provisioned weights associated with weighted scheduling queues 28 translate into priorities for scheduling EIR traffic 24. Thus, operators may cater more closely to the bandwidth requirements of particular users. Particular embodiments may facilitate providing improved traffic management with differential QoS.

FIG. 2 illustrates an example queue 12c according to certain embodiments of the present invention. Queue 12c includes a number of portions 30. In certain embodiments, portions 30 may be packets and will be referred to as such throughout the remainder of this description. In this example, queue 12c is a weighted scheduling queue 28 and includes packets of both CIR and EIR traffic. For example, a first subset of packets 30 may comprise CIR traffic 24 that is associated with a CIR parameter that specifies a guaranteed pass-through rate for packets 30 in the first subset. As another example, a second subset of packets 30 may comprise EIR traffic 24 that is associated with an excess pass-through rate for packets 30 in the second subset. Packets 30 within queue 12c may vary in size. Queue 12c may be any suitable size and may store any suitable number of packets 30 suitable for the size of queue 12c.

Figure 3:
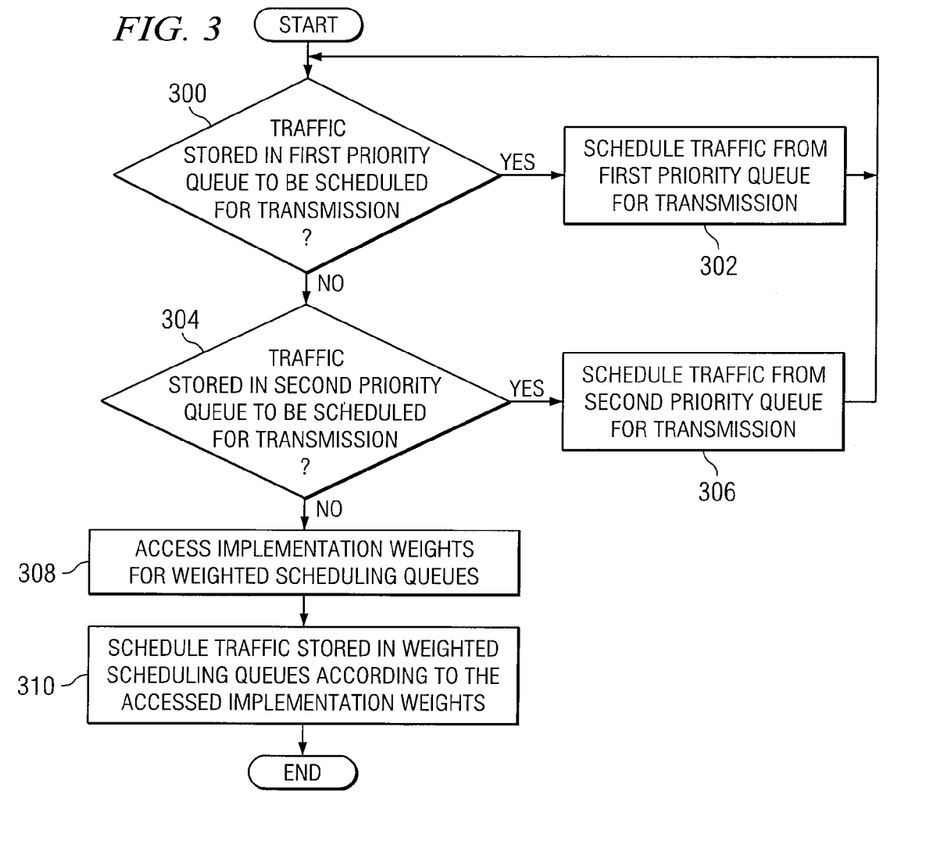
FIG. 3 illustrates an example method for bandwidth allocation according to certain embodiments of the present invention.

FIG. 3 illustrates an example method for bandwidth allocation according to certain embodiments of the present invention. The above example of four queues 12a through 12d will again be assumed for purposes of describing this example method. It will also be assumed again that queues 12a and 12b are priority queues 26, with queue 12a being a higher priority queue than queue 12b. It will also be assumed again that queues 12c and 12d are weighted scheduling queues 28, with queue 12c being assigned a provisioned weight of 70% and queue 12d being assigned a provisioned weight of 30%.

It will also be assumed that one or more of queues 12 store traffic flows 24. In certain embodiments, traffic flows 24 are stored in appropriate queues 12 by one or more policers. For example, a first traffic flow 24a may be received, traffic flow 24a comprising a CIR parameter. A policer may determine that traffic flow 24a should be stored in queue 12a, a priority data queue 26 for CIR traffic only. The policer may facilitate storage of traffic flow 24a in queue 12a. As another example, a second traffic flow 24b may be received, traffic flow 24b comprising a CIR parameter. A policer may determine that traffic flow 24b should be stored in queue 12b, a priority data queue 26 for CIR traffic only. The policer may facilitate storage of traffic flow 24b in queue 12b. As another example, a third traffic flow 24c may be received, traffic flow 24c comprising at least CIR and EIR parameters. A policer may determine that traffic flow 24c should be stored in queue 12c, a weighted scheduling queue 28 for traffic that includes both CIR and EIR parameters. The policer may facilitate storage of traffic flow 24c in queue 12c. As another example, a fourth traffic flow 24d may be received, traffic flow 24d comprising at least CIR and EIR parameters. A policer may determine that traffic flow 24d should be stored in queue 12d, a weighted scheduling queue 28 for traffic that includes both CIR and EIR parameters. The policer may facilitate storage of traffic flow 24d in queue 12d. The receipt and storage of traffic flows 24 in appropriate queues 12 may be a substantially continuous process.

At step 300, scheduler 14 determines whether any traffic 24 is stored in first priority queue 12a to be scheduled for transmission. In certain embodiments, queue 12a communicates a status to scheduler 14 such that scheduler 14 is informed of whether queue 12a is currently storing traffic 24 for scheduling and transmission. This status may be communicated automatically by queue 12a or in response to a request from scheduler 14. Additionally or alternatively, scheduler 14 may access queue 12a to determine whether queue 12a is currently storing traffic 24 for scheduling and transmission. If scheduler 14 determines at step 300 that traffic to be scheduled for transmission is stored in queue 12a, then at step 302 scheduler 14 may schedule traffic 24 stored in queue 12a for transmission. For example, scheduler 14 may schedule the next packet 30 stored in queue 12a for transmission. Since queue 12a is the highest priority queue 12 in this example, scheduler 14 may continue transmitting packets 30 from queue 12a until queue 12a is empty.

If scheduler 14 determines at step 300 that no traffic 24 to be scheduled for transmission is stored in queue 12a, then at step 304, scheduler 14 may determine whether any traffic 24 is stored in second priority queue 12b to be scheduled for transmission. In certain embodiments, queue 12b communicates a status to scheduler 14 such that scheduler 14 is informed of whether queue 12b is currently storing traffic 24 for scheduling and transmission. This status may be communicated automatically by queue 12b or in response to a request from scheduler 14. Additionally or alternatively, scheduler 14 may access queue 12b to determine whether queue 12b is currently storing traffic 24 for scheduling and transmission. If scheduler 14 determines at step 304 that traffic 24 to be scheduled for transmission is stored in queue 12b, then at step 306 scheduler 14 may schedule traffic stored in queue 12b for transmission. For example, scheduler 14 may schedule the next packet 30 stored in queue 12b for transmission. Since queue 12b is the second highest priority queue in this example, scheduler 14 may return to step 300 after communicating traffic 24 (e.g., a packet 30) from queue 12b to determine whether queue 12a (which has a higher priority than queue 12b) is now storing traffic 24 to be communicated.

If scheduler 14 determines at step 304 that no traffic 24 to be scheduled for transmission is stored in queue 12b, then at step 308, scheduler 14 may access the implementation weights determined for queues 12c and 12d (weighted scheduling queues 28). In certain embodiments, the implementation weights were previously calculated by application 30 of management module 22. Management module 22 may provide the determined implementation weights to scheduler 14 either spontaneously or in response to a request from scheduler 14. In certain embodiments, the implementation weights may be calculated according to one or more of the formulas described above with respect to FIG. 1.

At step 310, scheduler 14 may schedule traffic 24 stored in weighted scheduling queues 12c and 12d according to the accessed implementation weights. The implementation weights may have been determined based on a bandwidth of a downstream communication link (e.g., link 20), a CIR parameter of queue 12c, a CIR parameter of queue 12d, and each of the provisioned weights of queues 12c and 12d. If one of queues 12c or 12d is empty, scheduler 14 may simply schedule traffic 24 from the non-empty queue. In certain embodiments, traffic 24 stored in queues 12c and 12d is not scheduled for transmission unless both queues 12a and queues 12b are empty. Thus, after each transmission of a packet 30 from one of queues 12c and 12d (or at some other suitable interval) it may be appropriate to check queues 12a and 12b for traffic 24 to be scheduled.

If all queues 12 are empty of traffic 24 to be scheduled for transmission, the method may end. However, in certain embodiments, scheduler may simply enter a "wait" state until one or more of queues 12 stores traffic to be scheduled. In such embodiments, the method may not end until scheduler 14 either fails or is otherwise shut down.

Figure 4:
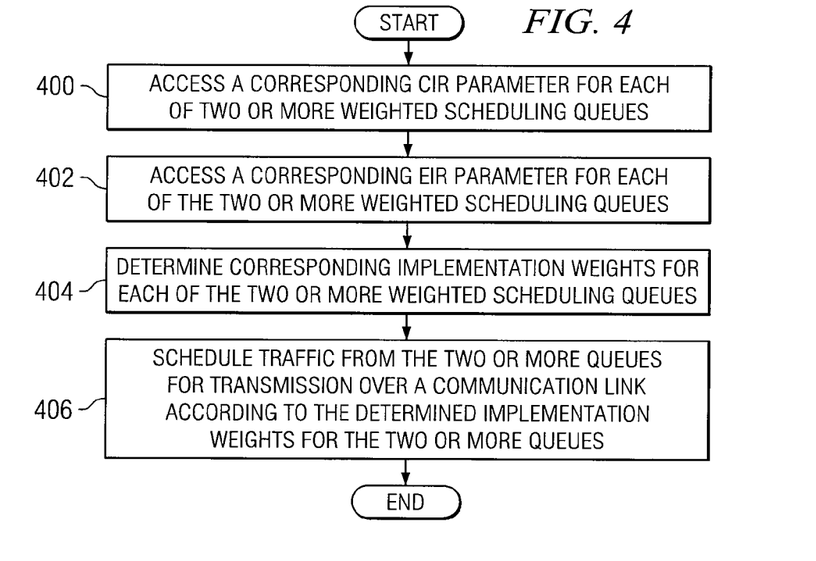
FIG. 4 illustrates an example method for bandwidth allocation that includes particular example details for determining two or more implementation weights, according to certain embodiments of the present invention.

FIG. 4 illustrates an example method for bandwidth allocation that includes particular example details for determining two or more implementation weights, according to certain embodiments of the present invention. In certain embodiments, at least certain steps of the method may be performed by management module 22 and/or scheduler 14, either alone or in combination. In this example, it is assumed that system 10 includes two or more weighted scheduling queues 28, each associated with a corresponding provisioned weight.

At step 400, a corresponding CIR parameter for each of two or more weighted scheduling queues 28 may be accessed, the CIR parameter for a queue being associated with a guaranteed pass-through rate. At step 402, a corresponding EIR parameter for each of the two or more weighted scheduling queues 28 may be accessed, the CIR parameter for a queue being associated with a guaranteed pass-through rate.

At step 404, corresponding implementation weight may be determined for each of the two or more weighted scheduling queues 28, the implementation weights for scheduling traffic 24 stored in the two or more weighted scheduling queues 28 for communication over a communication link 20. The corresponding implementation weights may be determined according to a bandwidth of communication link 20, each of the corresponding CIR parameters of the two or more weighted scheduling queues 28, and each of the corresponding provisioned weights of weighted scheduling queues 28.

At step 406, scheduler 14 may schedule traffic 24 from the two or more weighted scheduling queues 28 for transmission over the communication link according to the determined implementation weights for the two or more weighted scheduling queues 28. In certain embodiments, scheduler 14 may only schedule traffic 24 from the two or more weighted scheduling queues 28 if traffic 24 from all priority queues 26 has been scheduled.

Although particular methods have been described with reference to FIGS. 3-4, the present invention contemplates any suitable methods for bandwidth allocation in accordance with the present invention. Thus, certain of the steps described with reference to FIGS. 3 and 4 may take place substantially simultaneously and/or in different orders than as shown and described. Moreover, components of system 10 may use methods with additional steps, fewer steps, and/or different steps, so long as the methods remain appropriate.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed:

1. A method for bandwidth allocation, the method performed by one or more processing units and comprising:
receiving at least a first traffic flow and a second traffic flow, each traffic flow comprising at least committed information rate (CIR) and excess information rate (EIR) parameters, the CIR parameter in each traffic flow associated with a corresponding guaranteed pass-through rate;
storing the first traffic flow in a first queue;
storing the second traffic flow in a second queue, the first queue being associated with a first provisioned weight and the second queue being associated with a second provisioned weight; and
scheduling downstream transmission of the first traffic flow and second traffic flow stored in the first and second queues according to at least first and second implementation weights determined based on a bandwidth of a downstream communication link, a CIR parameter of the first queue, a CIR parameter of the second queue, and each of the first and second provisioned weights.

2. The method of claim 1, further comprising:
receiving a third traffic flow that comprises a CIR parameter;
storing the third traffic flow in a third queue, the third queue comprising a priority queue; and
scheduling downstream transmission of the third traffic flow stored in the third queue until the third queue is empty prior to scheduling the downstream transmission of the first traffic flow and the second traffic flow stored in the first and second queues according to the first and second implementation weights.

3. The method of claim 1, comprising calculating the first and second implementation weights according to the following formulas:

$$Q_C = W_C + (W_D * C_{CIR} - W_C * D_{CIR})/(X - A_{CIR} - B_{CIR}); \text{ and}$$

$$Q_D = W_D + (W_C * D_{CIR} - W_D * C_{CIR})/(X - A_{CIR} - B_{CIR}) = 1 - Q_C;$$

wherein:
the first queue corresponds to the variable C and the second queue corresponds to the variable D;
the variable A corresponds to a first priority queue and the variable B corresponds to a second priority queue;
$Q_c$ is the first implementation weight;
$Q_D$ is the second implementation weight;

W is the provisioned weight assigned to a queue, $W_C$ being the provisioned weight for the first queue and $W_D$ being the provisioned weight for the second queue;

X is a bandwidth of a downstream communication link;

$A_{CIR}$ is a total provisioned CIR for the first priority queue;

$B_{CIR}$ is a total provisioned CIR for the second priority queue;

$C_{CIR}$ is a total provisioned CIR for the first queue; and $D_{CIR}$ is a total provisioned CIR for the second queue.

4. The method of claim 1, comprising calculating a plurality of implementation weights corresponding to a plurality queues, the plurality of queues comprising the first and second queues, the first implementation weight corresponding to the first queue and the second implementation weight corresponding to the second queue, the plurality of implementation weights calculated according to the following formula:

$$Q_j = W_j + \left[(1-W_j)^* CIR_j - W_j^* \sum_{k=M+1, k \neq j}^{M+N} (CIR_k)\right] / \left(X/beta - \sum_{i=1}^{M} CIR_i\right)$$

(for $j = M+1 \ldots M+N$)

wherein:

Q is an implementation weight, j identifying the queue;

W is the provisioned weight of a queue;

M is a number of priority queues;

N is a number of weighted scheduling queues;

X is a bandwidth of a downstream communication link;

$CIR_j$ is a CIR of a queue j;

$CIR_k$ a CIR of a queue k;

$CIR_i$ is a CIR of queue i; and beta is a wide area network (WAN) encapsulation factor.

5. The method of claim 1, further comprising:

receiving a third traffic flow comprising at least CIR and BIR parameters; and storing the third traffic flow in the first queue in addition to the first traffic flow;

wherein the CIR parameter of the first queue comprises the sum of the CIR parameter of the first traffic flow and the CIR parameter of the third traffic flow.

6. The method of claim 1, further comprising:

receiving a third traffic flow comprising at least CIR and EIR parameters;

storing the third traffic flow in a third queue that is associated with a third provisioned weight; and scheduling downstream transmission of the first traffic flow, second traffic flow, and third traffic flow stored in the first, second, and third queues according to first, second, and third implementation weights determined based on the bandwidth of the downstream communication link, the CIR parameters of the first queue, the CIR parameters of the second queue, a CIR parameter of the third data queue, and each of the first, second, and third provisioned weights.

7. The method of claim 1, wherein one or more of the following are true when downstream transmission of the first and second traffic flows is scheduled according to the implementation weights:

the CIR parameter of the first queue and the CIR parameter of the second queue are substantially satisfied; and the EIR traffic is scheduled proportionally to the provisioned weights.

8. The method of claim 1, wherein the first and second provisioned weights are equal.

9. The method of claim 1, wherein the implementation weights of the first and second queues total the numeral one or one hundred percent.

10. The method of claim 1, further comprising scheduling traffic from one or more priority queues until the one or more priority queues are empty of traffic before scheduling traffic from the first and second queues.

11. The method of claim 1, wherein the first and second traffic flows are stored as packets in the first and second queues, respectively.

12. A system for allocating bandwidth, comprising:

a first queue operable to store a first received traffic flow;

a second queue operable to store a second received traffic flow, each of the first and second traffic flows comprising at least committed information rate (CIR) and excess information rate (EIR) parameters, the CIR parameter in each traffic flow associated with a corresponding guaranteed pass-through rate, the first queue being associated with a first provisioned weight and the second queue being associated with a second provisioned weight; and one or more processing units operable to schedule downstream transmission of the first traffic flow and second traffic flow stored in the first and second queues according to at least first and second implementation weights determined based on a bandwidth of a downstream communication link, a CIR parameter of the first queue, a CIR parameter of the second queue, and each of the first and second provisioned weights.

13. The system of claim 12, wherein:

the system further comprises a third queue operable to store a third received traffic flow that comprises a CIR parameter, the third queue comprising a priority queue; and the one or more processing units are further operable to schedule downstream transmission of the third traffic flow stored in the third queue until the third queue is empty prior to scheduling the downstream transmission of the first traffic flow and the second traffic flow stored in the first and second queues according to the first and second implementation weights.

14. The system of claim 12, wherein the one or more processing units are operable to calculate the first and second implementation weights according to the following formulas:

$$Q_C = W_C + (W_D{}^*C_{CIR} - W_C{}^*D_{CIR})/(X - A_{CIR} - B_{CIR}); \text{ and}$$

$$Q_D = W_D + (W_C{}^*D_{CIR} - W_D{}^*C_{CIR})/(X - A_{CIR} - B_{CIR}) = 1 - Q_C;$$

wherein:

the first queue corresponds to the variable C and the second queue corresponds to the variable D;

the variable A corresponds to a first priority queue and the variable B corresponds to a second priority queue;

$Q_c$ is the first implementation weight;

$Q_D$ is the second implementation weight;

W is the provisioned weight assigned to a queue, $W_c$ being the provisioned weight for the first queue and $W_D$ being the provisioned weight for the second queue;

X is a bandwidth of a downstream communication link;

$A_{CIR}$ is a total provisioned CIR for the first priority queue;

$B_{CIR}$ is a total provisioned CIR for the second priority queue;

$C_{CIR}$ is a total provisioned CIR for the first queue; and $D_{CIR}$ is a total provisioned CIR for the second queue.

15. The system of claim 12, wherein the one or more processing units are operable to calculate a plurality of implementation weights corresponding to a plurality queues, the plurality of queues comprising the first and second queues, the first implementation weight corresponding to the first queue and the second implementation weight corresponding to the second queue, the plurality of implementation weights calculated according to the following formula:

$$Q_j = W_j + \left[(1-W_j)^* CIR_j - W_j^* \sum_{k=M+1, k \neq j}^{M+N} (CIR_k)\right] \Big/ \left(X/beta - \sum_{i=1}^{M} CIR_i\right)$$

(for $j = M+1 \ldots M+N$)

wherein:
Q is an implementation weight, j identifying the queue;
W is the provisioned weight of a queue;
M is a number of priority queues;
N is a number of weighted scheduling queues;
X is a bandwidth of a downstream communication link;
$CIR_j$ is a CIR of a queue j;
$CIR_k$ a CIR of a queue k;
$CIR_i$ is a CIR of queue i; and
beta is a wide area network (WAN) encapsulation factor.

16. The system of claim 12, wherein:
the first queue is operable to store, in addition to the first traffic flow, a third received traffic flow comprising at least CIR and FIR parameters; and
the CIR parameter of the first queue comprises the sum of the CIR parameter of the first traffic flow and the CIR parameter of the third traffic flow.

17. The system of claim 12, wherein:
the system further comprises a third queue operable to store a third received traffic flow that comprises at least CIR and BIR parameters, the third queue being associated with a third provisioned weight; and
the one or more processing units are operable to schedule downstream transmission of the first traffic flow, second traffic flow, and third traffic flow stored in the first, second, and third queues according to first, second, and third implementation weights determined based on the bandwidth of the downstream communication link, the CIR parameters of the first queue, the CIR parameters of the second queue, a CIR parameter of the third data queue, and each of the first, second, and third provisioned weights.

18. The system of claim 12, wherein one or more of the following are true when downstream transmission of the first and second traffic flows is scheduled according to the implementation weights:
the CIR parameter of the first queue and the CIR parameter of the second queue are substantially satisfied; and
the EIR traffic is scheduled proportionally to the provisioned weights.

19. The system of claim 12, wherein the first and second provisioned weights are equal.

20. The system of claim 12, wherein the implementation weights of the first and second queues total the numeral one or one hundred percent.

21. The system of claim 12, wherein the one or more processing units are operable to schedule traffic from one or more priority queues until the one or more priority queues are empty of traffic before scheduling traffic from the first and second queues.

22. The system of claim 12, wherein the first and second traffic flows are stored as packets in the first and second queues, respectively.

23. A method for allocating bandwidth, the method performed by one or more processing units and comprising:
accessing a corresponding committed information rate (CIR) parameter for each of two or more weighted scheduling queues, the CIR parameter for a queue associated with a guaranteed pass-through rate;
accessing a corresponding excess information rate (EIR) parameter for each of the two or more weighted scheduling queues, each weighted scheduling queue associated with a corresponding provisioned weight;
determining corresponding implementation weights for each of the two or more weighted scheduling queues, the implementation weights for scheduling traffic stored in the two or more weighted scheduling queues for communication over a communication link and being determined according to a bandwidth of a communication link, each of the corresponding CIR parameters, and each of the corresponding provisioned weights.

24. The method of claim 23, further comprising scheduling traffic from the two or more queues for transmission over a communication link according to the determined implemented weights for the two or more weighted scheduling queues.

25. The method of claim 23, wherein the value of the CIR parameter corresponding to a queue comprises a total provisioned CIR determined by summing CIR parameters for a plurality of traffic flows stored in the queue.

26. The method of claim 23, comprising calculating the corresponding implementation weights for the two or more weighted scheduling queues according to the following formula:

$$Q_j = W_j + \left[(1-W_j)^* CIR_j - W_j^* \sum_{k=M+1, k \neq j}^{M+N} (CIR_k)\right] \Big/ \left(X/beta - \sum_{i=1}^{M} CIR_i\right)$$

(for $j = M+1 \ldots M+N$)

wherein:
Q is an implementation weight, j identifying the queue;
W is the provisioned weight of a queue;
M is a number of priority queues;
N is a number of weighted scheduling queues;
X is a bandwidth of a downstream communication link;
$CIR_j$ is a CIR of a queue j;
$CIR_k$ a CIR of a queue k;
$CIR_i$ is a CIR of queue i; and
beta is a wide area network (WAN) encapsulation factor.

27. The method of claim 23, wherein one or more of the following are true when traffic stored in the two or more weighted scheduling queues is scheduled according to the implementation weights:
the corresponding CIR parameters of the two or more weighted scheduling queues are substantially satisfied; and
the corresponding EIR parameters satisfied proportionally to the provisioned weights.

28. The method of claim 23, wherein the implementation weights of the two or more weighted scheduling queues total the numeral one or one hundred percent.

29. The method of claim 23, further comprising scheduling transmission of traffic stored in one or more priority queues until the one or more priority queues are empty of traffic prior to scheduling traffic from the two or more weighted scheduling queues according to the corresponding implementation weights.

30. The method of claim 23, wherein the traffic is stored as packets in the two or more weighted scheduling queues.

* * * * *